United States Patent [19]

Chesnoy et al.

[11] Patent Number: 4,815,080

[45] Date of Patent: Mar. 21, 1989

[54] LASER PROVIDING STABLE FEMTOSECOND PULSES

[75] Inventors: José Chesnoy, Paris, France; Lorenzo Fini, Florence, Italy

[73] Assignee: Centre National de la Recherche Scientifique, France

[21] Appl. No.: 49,473

[22] Filed: May 14, 1987

[30] Foreign Application Priority Data

May 14, 1986 [FR] France .................................. 86 06944

[51] Int. Cl.[4] ............................................. H01S 3/098
[52] U.S. Cl. ........................................ 372/30; 372/18; 372/25; 372/94
[58] Field of Search ...................... 372/18, 25, 30, 94, 372/92, 32, 31

[56] References Cited

U.S. PATENT DOCUMENTS

| 3,457,415 | 7/1969 | Lipsett et al. | 372/32 |
| 3,711,786 | 1/1973 | Vautier et al. | 372/32 |
| 3,713,042 | 1/1973 | Kinsel | 372/32 |
| 4,081,765 | 3/1978 | Berg et al. | 372/32 |
| 4,272,734 | 6/1981 | Jarrett et al. | 372/32 |
| 4,284,964 | 8/1981 | Maier, Jr. | 372/32 |
| 4,400,814 | 8/1983 | Fork et al. | 372/94 |
| 4,606,031 | 8/1986 | Beene et al. | 372/32 |
| 4,617,665 | 10/1986 | Mourou et al. | 372/94 |
| 4,727,553 | 2/1988 | Fork et al. | 372/25 |
| 4,730,105 | 3/1988 | Mitschke et al. | 372/31 |

FOREIGN PATENT DOCUMENTS

| 0214260 | 10/1984 | Fed. Rep. of Germany | 372/25 |
| 0218499 | 2/1985 | Fed. Rep. of Germany | 372/25 |

OTHER PUBLICATIONS

Fork et al., "Generation of Optical Pulses . . . Mode Locking"; Appl. Phys. Lett., vol. 38, No. 9, May 1, 1981; pp. 671-672.
Ippen et al.; "Passive Mode . . . CW Dye Laser"; Appl. Phys. Lett., vol. 21, No. 8; 10/15/1972, pp. 348-350.
Shank et al.; "Time Resolved . . . Optical Pulses"; Proceeding of the 2nd International Conference on Laser Spectroscopy; Jun. 23-27, 1975; pp. 408-419.
Couillaud et al.; "Synchrons Mode . . . Amplifier Medium"; Applied Physies Letters, vol. 29, No. 10, Nov. 15, 1976; pp. 665-666.
Li; "Stability and Astigmatic . . . Dye Lasers"; Applied Optics; vol. 21, No. 5; Mar. 1, 1982; pp. 967-970.
Johnson et al.; "Continuous-Wave . . . Dye Lasers"; 1983; Optical Society of America; pp. 554-556.
Fork et al.; "Negative Dispersion . . . Prisms"; Optics Letters; vol. 9, No. 5; May 1984; pp. 150-152.
May et al., "Subpicosecond Pulse Generation in Synchronously Pumped and Hybrid Ring Dye Lasers"; vol. B26, No. 3 (Nov. 1981).
Ferguson et al., "Active Mode Stabilization of a Synchronously Pumped Mode Locked Dye Laser"; vol. 41, No. 4 (Apr. 1982).
Norris et al., "Generation of 85-fsec Pulses by Synchronous Pumping of a Colliding-Pulse Mode-Locked Dye Laser"; vol. 2 No. 4 (Apr. 1985).

Primary Examiner—William L. Sikes
Assistant Examiner—Xuan Thi Vo
Attorney, Agent, or Firm—Robbins & Laramie

[57] ABSTRACT

A femtosecond dye laser comprises a dye amplifier assembly (30) pumped by a mode-locked neodymium YAG laser (35) operating with frequency doubling. The main dye laser cavity as defined on one side of the amplifier assembly (30) by a linear prism structure (11 and 14) leading to an outlet mirror (15), and on the other side of the amplifier assembly by an assembly (20) constituting an anti-resonant mirror disposed about a saturable absorption device (40). An error signal is tapped by leakage from one of the mirrors (22) and is spectrally analyzed and compared with a reference wavelength (at 50) enabling a high tension amplifier (60) to be controlled to act on a piezo-electric stack (19) in order to fix the position of the outlet mirror (15) so as to adjust the optical length of the cavity as a function of the spectral characteristics of the pulses it produces.

17 Claims, 3 Drawing Sheets

LASER PROVIDING STABLE FEMTOSECOND PULSES

The invention relates to lasers having very fine time resolution.

BACKGROUND OF THE INVENTION

Lasers are now commercially available which produce light pulses having durations of about one picosecond (ps) or a little less (subpicosecond). They are obtained by synchronously pumping a dye laser using a continuous wave (c.w.) mode-locked pumping laser (argon or frequency doubled YAG).

However, there is no commercially available laser capable of delivering pulses that are shorter than 0.5 ps, even though pulses of a few tens of femtoseconds (fs) duration can be obtained in the laboratory. Such pulses are highly unstable in duration, amplitude, and spectral characteristics.

It should also be observed that the operation of femtosecond lasers is highly complex. Heretofore, they have been described only in qualitative terms. No satisfactory quantitative model has been proposed, given the very high number of parameters involved.

In Appl. Phys. Letters 38, 671 (1981), R. L. Fork, B. I. Green, and C. V. Shank describe a dye laser comprising an assembly including a saturable absorbent in a ring structure. The dye amplifier assembly was continuously pumped by an argon laser. The ring structure with the saturable absorbent was called CPM for "colliding pulse mode-locking". The pulse duration was about 0.11 picoseconds.

It has subsequently been observed that synchronous pumping provides decisive advantages, using either a mode-locked YAG laser with frequency doubling (T. Norris, T. Sizer II, G. Mourou, J.O.S.A.B., 2, 613, 1985) or else using a mode-locked argon laser (M. C. Nuss, R. Leonhardt, W. Zinth, Optics Letters 10, 16, 1985). These advantages include the possibility of synchronous amplification and the possibility of pumping a standard tunable picosecond laser synchronously and in parallel.

Unfortunately, for a cavity of given characteristics, synchronously pumped lasers are much less stable than are continuously pumped lasers. In particular, a bistable one-way rotation phenomenon has been observed by A. M. Johnson and W. M. Simpson, Optics Letters 8, 554, 1983.

It is possible to avoid this behavior either by selecting a suitable sequence of pumping pulses (Nuss et al), or else by making use of a linear cavity together with an anti-resonant ring having the jet of saturable absorbent placed in the middle thereof (Norris et al).

However, even when improved in this way, femtosecond dye lasers with synchronous pumping remain extremely sensitive both in stability and in pulse duration to any slight mis-tuning in the length of the cavity.

For example, for 100 fs pulses, Nuss et al indicate that the length of the cavity must be adjusted to within 0.2 micrometers (i.e. to a relative value of better than $10^{-7}$).

At this level of accuracy, numerous factors have an effect:

instabilities in the pumping pulse rate, which ought to be avoidable, at least in theory;

thermal expansion and mechanical vibration of the components of the cavity; and variations in the refractive index of air as a function of ambient humidity, or pressure, or temperature.

It is therefore practically impossible to maintain the desired accuracy for the optical length of the cavity, given that it is to be expected that this accuracy constraint will increase as the desired pulse duration is reduced.

The present invention helps solve this problem in a manner which would be impossible for passive temperature compensation.

A first aim of the invention is to obtain good stability both in the short term and in the long term (several hours) concerning the length or the duration of laser pulses.

Another aim of the invention is to improve the amplitude and frequency stability of a femtosecond laser.

SUMMARY OF THE INVENTION

To this end the present invention provides, in combination:

an auxiliary mode-locked synchronous pumping laser;

a main laser cavity, including a dye amplifier assembly pumped by the auxiliary laser together with a saturable absorbent assembly; and stabilization means suitable for adjusting the optical length of the main laser cavity as a function of the difference between the spectrum of the pulses produced thereby and a desired central wavelength, and in a direction suitable for reducing said difference.

More particularly, the stabilization means comprise:

means for tapping a small portion of the laser beam produced;

means for comparing the spectral position of said small portion relative to the desired central wavelength; and means for adjusting the optical length of the main laser cavity as a function of said comparison and in a direction tending to latch the spectrum onto the desired central wavelength.

Preferably, the outlet mirror of the main cavity is mounted on a piezo-electric stack controlled by the stabilization means in order to adjust said optical length.

Most advantageously, the main laser cavity is at least partially disposed in a ring containing the saturable absorbent assembly, such that two pulses running round the ring in opposite directions collide with each other within the saturable absorbent (CPM operation).

In one embodiment of the invention, the main laser cavity includes a first optical path on one side of the dye amplifier assembly and passing via a separator blade disposed to transmit the laser beam to two facing mirrors in a symmetrical disposition about the saturable absorbent assembly.

Preferably, the main laser cavity also includes a prism assembly suitable for adjusting the group dispersion of the laser beam inside the cavity.

Yet more particularly, the stabilization means make use of beam leakage through one of the two facing mirrors and acts on the position of the outlet mirror. Any other method of tapping the laser beam could also be used.

According to one aspect of the invention, the amplifying jet is positioned at the center of the main laser cavity which is twice as long as the auxiliary laser cavity and which operates at twice the repetition rate of the main laser, thereby enabling the power per pulse to be increased.

BRIEF DESCRIPTION OF THE DRAWINGS

An embodiment of the invention is described by way of example with reference to the accompanying drawings, in which.

The accompanying drawings constitute an integral portion of the present description and may contribute not only to obtaining a fuller understanding thereof, but also to defining the invention, where appropriate.

MORE DETAILED DESCRIPTION

Figure 1:
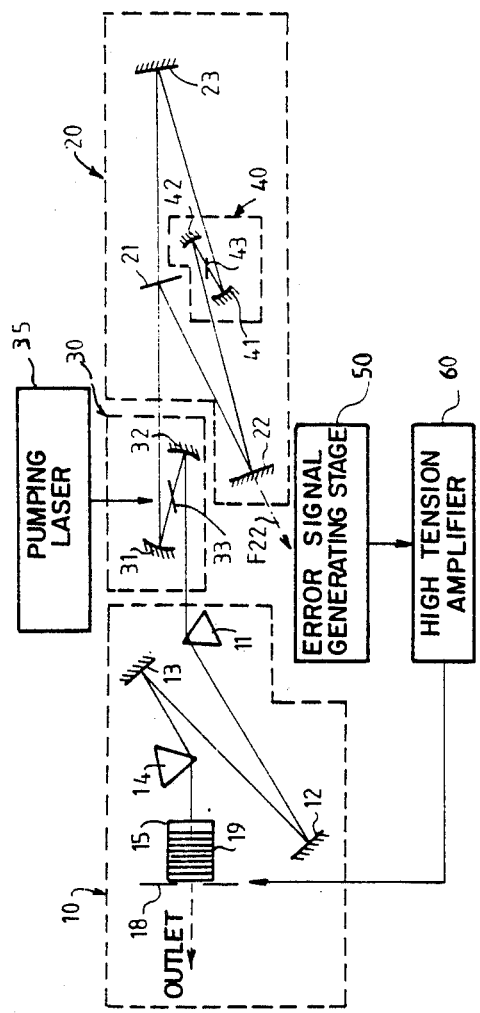
FIG. 1 is a block diagram of a laser in accordance with the present invention.

In FIG. 1, the central portion of a laser in accordance with the invention is a dye amplifier assembly 30. This assembly comprises two spherical mirrors 31 and 32 with a jet 33 of amplifier dye such as the dye known as Rhodamine 6 G being produced at the focus thereof. As explained below, this dye amplifier assembly 30 is excited by an auxiliary mode-locked pumping laser referenced 35.

The main cavity of the dye laser in accordance with the invention is defined on either side of the amplifying assembly 30. To the left it is constituted by a linear assembly ("linear" being in contrast to the "ring" assembly described below). This linear assembly includes two prisms 11 and 14 having return mirrors 12 and 13 disposed therebetween. The cavity is terminated at an outlet mirror 15. In conventional manner, the outlet from the laser is defined by transmission through the mirror 15.

In accordance with the invention, the mirror 15 is mounted on a stack of piezo-electric shim 19 mounted on a support 18 having a window for outputting laser pulses.

On the other side of the dye amplifier assembly 30, the main cavity of the laser continues linearly for a short distance until it encounters a separator blade 21 suitable for producing a reflected beam and a transmitted beam of the same amplitude. Thereafter, the main laser cavity is constituted by a ring section 20. The reflected and transmitted beams from the semi-transparent blade 21 are received by respective mirrors 22 and 23 which apply them to a saturable absorbent dye assembly 40.

This assembly also makes use of two spherical mirrors 41 and 42 having a jet 43 of saturable absorbent at the center thereof.

The person skilled in the art will understand that the main laser cavity is, in practice, defined between the jet 43 and the outlet mirror 15. The ring structure 20 defines a kind of anti-resonant mirror in which two pulses propagating in opposite directions can meet within the jet 43 and recombine at the separator blade 21 on their return.

Preferably, the optical path length from the jet 33 to the outlet mirror 15 is equal to the optical path length from the jet 33 to the jet 43, and the jet 43 is preferably constituted by a dye such as that known by the name DODCI (dioxadicarbocyanine iodide).

Structures such as the amplifier assembly 30 and the saturable absorption assembly 40, each of which is simply constituted by reflecting focussing optics having a jet (rather than a tank) of dye in solution in ethylene glycol at the focus thereof are now in common use in continuous wave dye lasers (with a few variations).

The use of a ring structure 20 constituting an anti-resonant mirror has been described, particularly in the above-mentioned article by Norris et al, and was initially proposed by Siegman and Vanherzeele (Picosecond Phenomena III, Springer Verlaq 1982, page 14).

The set of prisms 11 and 14 serves to compensate group speed dispersion within the cavity such as may be present in laser pulses, as described by R. L. Fork, O. E. Martinez and J. P. Gordon, Optics Letters 9, 150 (1984).

According to the invention, a portion of the laser pulses is tapped, e.g. by leakage through the mirror 22. A variant consists in using a separator blade outside the cavity in order to perform the necessary tapping. The leakage is labelled F22. It is applied to a stage 50 which serves to generate an error signal. The error signal controls a high tension amplifier 60 which acts on the piezo-electric stack 19 so as to adjust the optical length of the cavity in order to compensate the difference between the central wavelength of the laser pulse spectrum and the desired wavelength.

Figure 2:
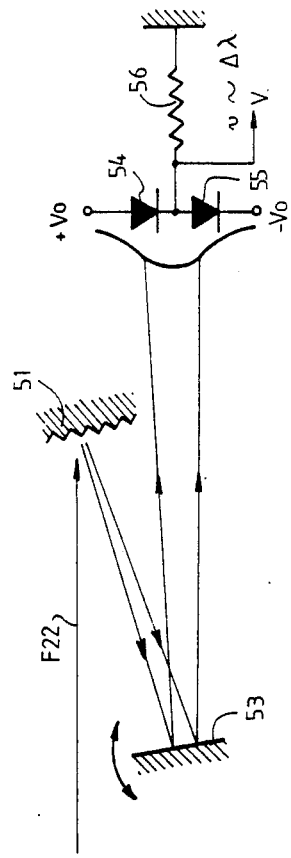
FIG. 2 is a detailed diagram of a portion of FIG. 1.

More precisely (FIG. 2), the ray F22 is applied to a dispersing element such as a diffraction grating 51 which may be a plane grating (or a prism, or a Fabry-Perot etalon). The light returned therefrom is picked up by a mirror 53 of adjustable orientation. The radiation reflected by the mirror 53 is applied to a set of two photodiodes 54 and 55 connected in series between a potential $+V0$ and a potential $-V0$. The mid-point between these two diodes is connected to ground via a resistor 56 and provides a voltage v.

This circuit constitutes a "photometric balance" and the voltage v is directly proportional (for small variations) to the difference between the central frequency of the laser and the desired wavelength at which both photodiodes would be illuminated identically.

The voltage v can then be applied to a high tension amplifier 60 in order to adjust the position of the outlet mirror 15 by means of the piezo-electric stack 19 in a direction suitable for compensating any variations in wavelength as defined by the error signal.

A variant consists in using a current/voltage converter.

Proper operation of this apparatus also depends on another observation, described in greater detail below, namely that there exists a correlation between the central frequency of the laser and the length of the laser cavity.

PARTICULAR EXAMPLE

In this example, the auxiliary laser 35 is a commercially available neodymium YAG laser (Quantronics type 416) operating as a mode-locked continuous wave laser. After frequency doubling in conventional manner, this laser is suitable for delivering a train of pulses having a length of 60 picoseconds and at a rate of 100 MHz. An average power of one watt can be obtained at a wavelength of 532 nanometers.

This train of pumping pulses is focused on a jet of Rhodamine 6 G (diluted to $10^{-3}$ M in ethylene glycol), having a thickness of 200 micrometers and situated in the center of the main laser cavity.

The jet 43 is a jet of DODCI dye (diluted to 3 to $4 \times 10^{-3}$ M in ethylene glycol) and accurately positioned at the center of the anti-resonant ring 20. The thickness of the jet is adjusted in situ to about 20 micrometers by adjusting the throttling of an appropriate nozzle.

On the other side of the dye amplifier assembly 30, the linear configuration of the laser cavity makes it possible to adjust the length of the cavity without taking it out of alignment. In addition, all of the outlet power can be extracted in a single beam, whereas at the other end the anti-resonant ring 20 serves to obtain the CPM effect (as defined above) in the jet of DODCI dye.

As already mentioned, pumping at 100 MHz performed in the center of the main laser cavity makes it possible to operate twice over during a single go-and-return time of 20 nanoseconds for one pulse in the dye laser.

Nevertheless, overall operation takes place at 50 MHz. In theory it is bistable, but it is locked by the presence of the jet of absorbent.

The average outlet power is therefore comparable to that from similar lasers having a peak pulse power which is twice as high. It has also been observed that the position of the jet of Rhodamine 6 G is not critical, at least to within a few centimeters.

For pumping at 700 milliwatts, the main dye laser emits a pulse train having an average power of 35 to 40 milliwatts.

Experiments have been performed. In particular, the curve of FIG. 3 has been obtained, which curve constitutes an autocorrelation trace of intensity obtained by generating harmonics in a KDP crystal (potassium dihydrogen phosphate) having a thickness of 0.3 millimeters.

The half-height width of 100 femtoseconds corresponds to a pulse width of 64 femtoseconds for a $sech^2$ shape (the inverse of the hyperbolic cosine, squared), which implies a correction factor of 1.54. The observed spectrum is slightly asymmetric having a half height width of 8 nanometers, which gives a band product of 0.4. It may also be observed that the peak power of the emitted pulse exceeds 10 kilowatts.

By increasing the pumping power, a greater average power is obtained at the outlet, however the additional energy lies outside the femtosecond pulse since the auto-correlation trace does not increase accordingly.

The most stable laser operation was obtained when the intra-cavity dispersion gave rise to moderate frequency shift ("downchirp") in each pulse, which is easily compensated outside the cavity by a glass of several millimeters.

Figure 4:
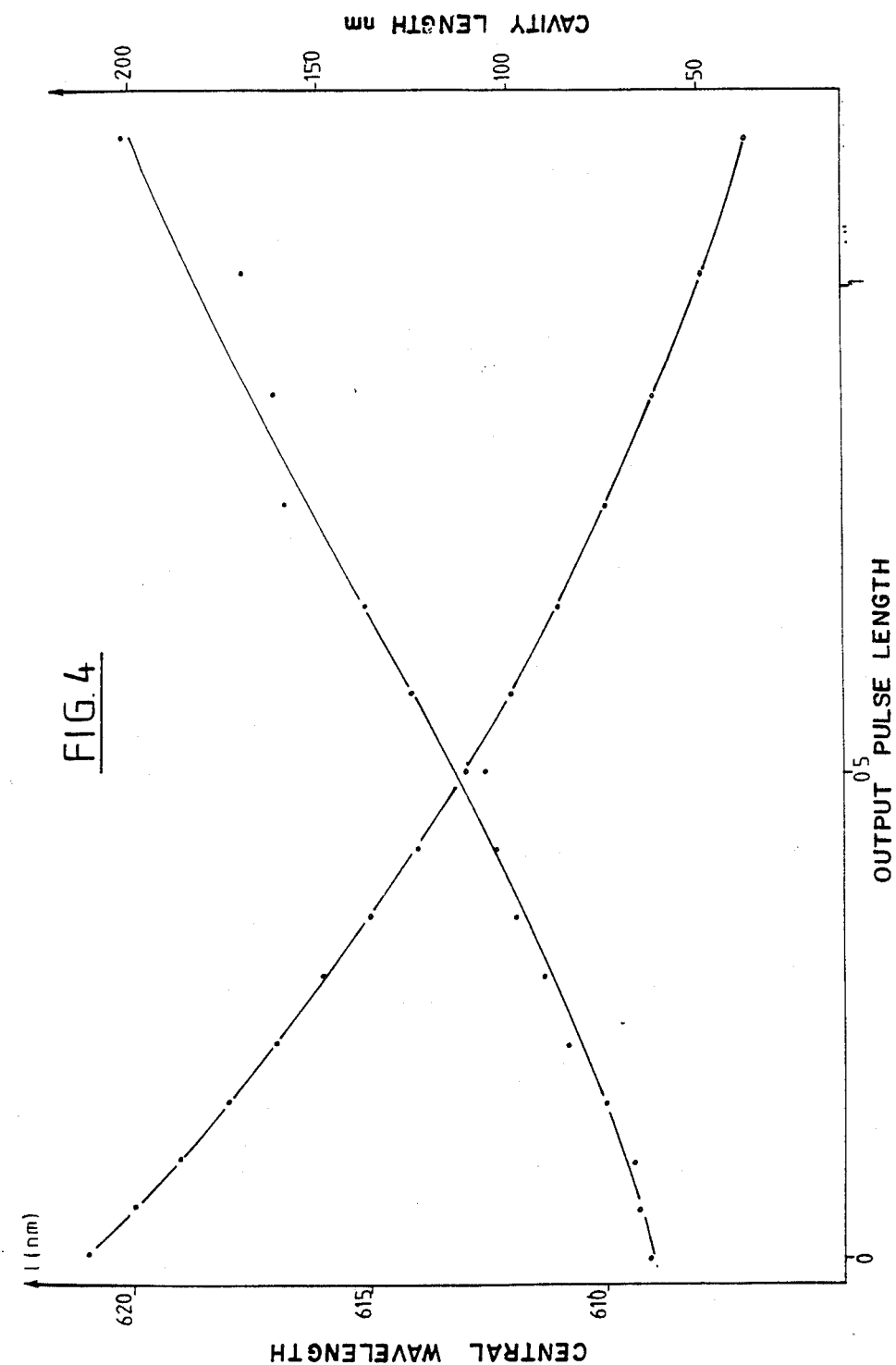
FIG. 4 is a graph showing two curves describing the dependence of pulse duration and pulse wavelength as a function of the length of the cavity during laser operation.

The main observation drawn therefrom is as follows: under the effect of variation in the length of the cavity of the main dye laser, the central wavelength $l_0$ of the light pulse is displaced as shown in FIG. 4. This possibility of limited tuning is accompanied by a variation in the width of the pulse as also shown in FIG. 4. This behavior may be understood qualitatively: when the length of the main cavity is increased, the femtosecond pulse is delayed relative to the pumping pulse and is therefore subjected to higher gain in the amplifying jet. The net resulting gain is a compromise between the gain of the amplifier and the loss which occurs in the saturable absorbent. This net resultant gain is thus displaced towards shorter wavelengths. The saturation phenomena which occur both in absorption and in amplifier gain do not modify the process qualitatively, but naturally they make it impossible to provide a simple quantitative description.

From FIG. 4 it can be seen that an increase in pulse duration of about ten percent corresponds more or less to a length mismatch of about 0.1 micrometers, while a frequency shift of 1 nanometer is associated with the cavity being mis-tuned by as little as 0.05 micrometers. This is the observation from which it is deduced that a shift in the central frequency of the laser constitutes a remarkable error signal for determining the length mismatch of the cavity. The apparatus in accordance with the present invention is based on this observation: cavity mis-tuning may be observed relative to a reference wavelength by means of the device 50 and 60 in FIGS. 1 and 2. Suitable feedback can then be used to adjust the length of the cavity accordingly.

The differential signal produced between the two photodiodes 54 and 55 is thus used to control the piezoelectric stack 19 via the high tension amplifier 60.

The frequency bandwidth of the feedback loop in the apparatus built is about 200 Hz, and is limited by the high tension amplifier. Its static open loop gain is about 1000.

It is thus possible to obtain good stability for the central wavelength of the laser, both in the short term and in the long term (several hours), and with an accuracy of 0.5 nanometers. The wavelength of the pulses can easily be tuned over a limited frequency band running from 607 nanometers to 621 nanometers by displacing the two detection photodiodes. However, best performance is restricted to the 617 nanometer to 620 nanometer band.

Figure 3:
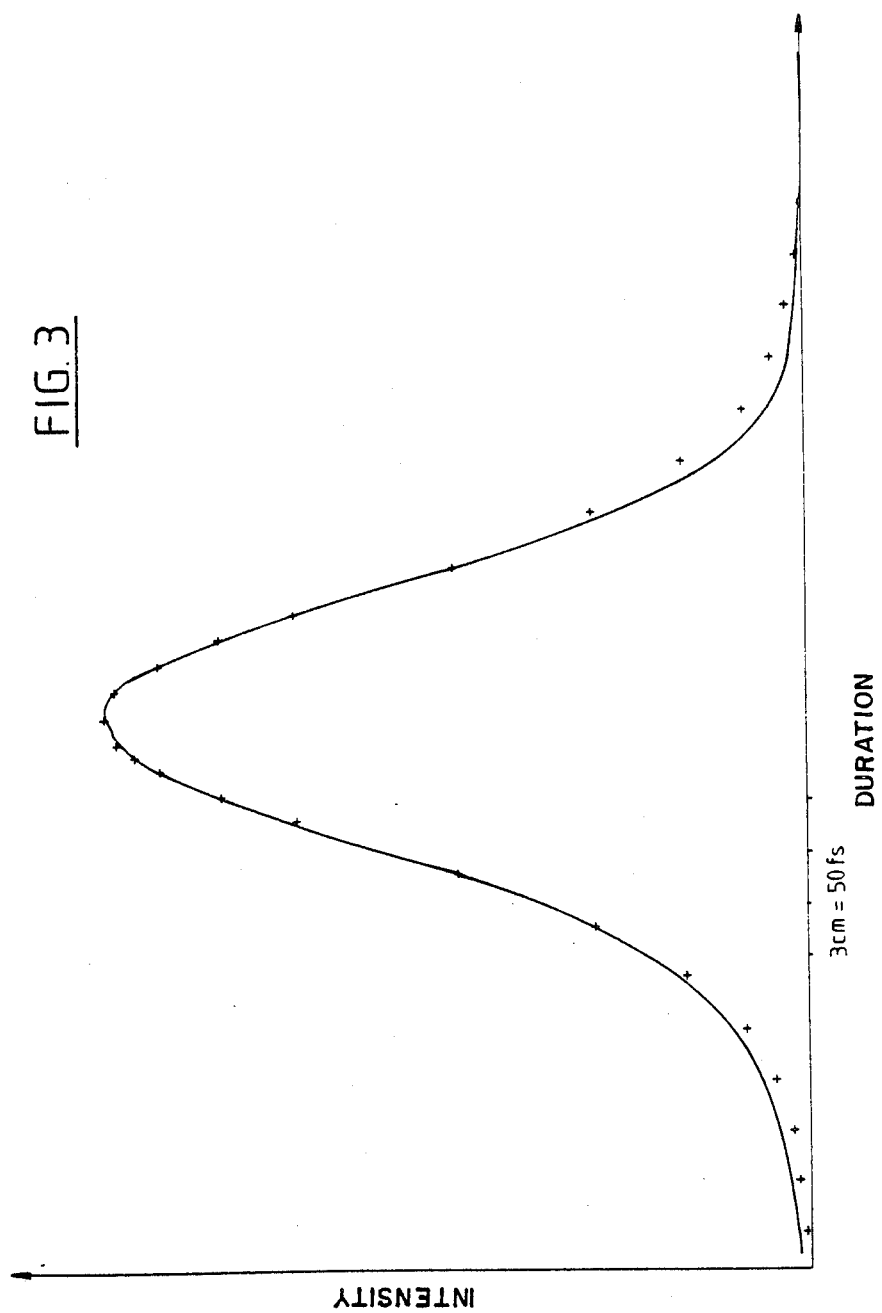
FIG. 3 is a graph showing a set of curves describing the time characteristics of laser pulses in accordance with the invention.

With this assembly, fluctuations in pulse width have remained undetectable on auto-correlation traces such as that shown in FIG. 3, for typical pulse durations of 70 femtoseconds.

A quite unexpected advantage of the feedback loop in accordance with the invention lies in the amplitude stabilization of the pulse train. Pulse amplitude stabilization to within at least 5% is ensured in spite of fluctuations in the pumping pulses which exceed 10%. This intensity stabilization probably stems from the fact that the laser wavelength is determined by the gain level at the arrival of the femtosecond pulse at the jet of Rhodamine 6 G. As a result, the feedback loop modulates the relative delay between pumping pulses and dye laser pulses, thereby conferring a given gain to the femtosecond pulse.

Manifestly, the present invention provides an extremely simple and effective means for stabilizing a femtosecond laser, and this has not been possible with any prior devices.

Naturally, the present invention is not limited to the embodiment described. It is believed that the invention can be applied to any type of laser in which there exists a relationship between wavelength, pulse duration, and cavity length having the appearance of that shown in FIG. 4.

Further, the pumping laser 35 is not necessarily a frequency doubled neodymium YAG laser. An argon laser could be used, or a krypton laser, for example.

In the structure described above, only a portion of the main laser cavity is constituted by a ring. In other embodiments, the entire main laser cavity could be constituted by a ring, as described by Fork et al.

Likewise, the use of prisms for compensating group velocity dispersion in the pulses is advantageous, but other equivalent means may be used.

Finally, although not tested so far, it is possible that a laser in accordance with the invention may be capable of operating without requiring an anti-resonant assembly for the jet of saturable absorbent. It appears that femtosecond lasers using other dyes are capable of operating without CPM action (Dobler Schulz and Zinth, Optics Com 57,407 (1986)).

On another topic, it has been assumed above that the auxiliary pumping laser 35 is a continuous wave laser, i.e. a laser which produces pulses permanently. In some applications it would be quite possible to use a laser which merely produces pulse trains.

In other variants, the leakage signal F22 could be taken from a point other than from the mirror 22, and in particular it could be taken from any one of the other mirrors used in the laser structure.

Although it is at present most convenient to vary the optical length of the cavity by acting on the outlet mirror 15, it would naturally be possible to vary its length by taking action elsewhere.

Finally, the spectrum width of the laser pulses produced by the apparatus described above is about 10 nanometers. In practice, it is naturally preferable to pre-adjust the feedback loop so as to bring the spectrum of the pulses produced by the laser into the vicinity of the desired central wavelength, since otherwise the feedback loop will be incapable of operating. This pre-adjustment may be performed either manually or by means of a suitable device within the high tension amplifier 60. A high tension amplifier which is suitable for implementing the invention is the double DC-AC converter sold by KEPKO (USA), for example.

After such pre-adjustment, the system arrives in a zone where the error signal varies linearly (or at least monotonically) about the optimum value for giving the shortest pulses.

Naturally, means may be provided for enabling automatic re-acquisition by the servo-loop supposing that synchronization is accidentally lost due to a large disturbance such as a shock wave related to a door being slammed, for example.

On another topic, it is also possible to insert items in the main laser cavity suitable for making the laser "tunable", for example an etalon or a tuning wedge may be used.

Finally, it is important to recall that research performed prior to the present invention sought to stabilize the length of the laser cavity independently from the quality of mode locking.

In contrast, the technique of the present invention turns out to be more sensitive to the quality of mode locking than to the absolute length of the cavity since it takes account of the optical spectrum of the pulses seen overall. Stability in the optical spectrum is a quality of greatest importance for numerous applications.

We claim:

1. A laser system comprising:
   an outlet mirror, a mirror system and a main laser cavity formed therebetween, said main laser cavity having an adjustable optical length and adjustment means for adjusting the optical length of the main laser cavity;
   active laser amplification means located in said main laser cavity comprising a dye amplifier assembly adapted to receive pump pulses and a saturable absorbent assembly optically coupled with said dye amplifier assembly and said main laser cavity to produce a laser beam constituted of femtosecond laser pulses upon application of pump pulses to said dye amplifier assembly, said laser pulses having a spectrum centered about a central wavelength;
   an auxiliary mode locked laser having an auxiliary laser cavity feeding said dye amplifier assembly with pump pulses; and
   detection means for detecting the difference between the central wavelength of the spectrum of said femtosecond laser pulses and a desired central wavelength, and for acting on said adjustment means in order to reduce said difference, so that stability is obtained concerning the duration, the amplitude and the frequency of said femtosecond laser pulses.

2. A laser system according to claim 1, wherein the detection means comprises:
   means for tapping a small portion of said laser beam produced;
   means for comparing the spectral position of said small portion with said desired central wavelength; and
   means for acting on said adjustment means for adjusting said optical length in a direction tending to reduce said difference between the central wavelength of said laser beam and said desired central wavelength.

3. A laser system according to claim 1, wherein said adjustment means comprises a piezo-electric stack supporting said outlet mirror.

4. A laser system comprising:
   an outlet mirror and a mirror system, and a main laser cavity formed therebetween, said main laser cavity being at least partially in the form of a ring, having an adjustable optical length and adjustment means for adjusting said optical length of the main laser cavity;
   active laser amplification means located in said main laser cavity comprising a dye amplifier assembly adapted to receive pump pulses, and a saturable absorbent assembly within said ring optically coupled with said dye amplifier assembly and said main laser cavity to produce a laser beam constituted of femtosecond laser pulses upon application of pump pulses to said dye amplifier assembly such that two laser pulses running around said ring in opposite directions meet in the saturable absorbent, said laser pulses having a spectrum centered about a central wavelength;
   an auxiliary mode-locked laser having an auxiliary laser cavity and feeding said dye amplifier assembly with pump pulses; and
   detection means for detecting the difference between the central wavelength of the spectrum of said femtosecond laser pulses and a desired central wavelength, and for acting on said adjustment means in order to reduce said difference, so that good stability is obtained concerning the duration, the amplitude and the frequency of said femtosecond laser pulses.

5. A laser system according to claim 4 wherein the detection means comprises:
   means for tapping a small portion of said laser beam produced;
   means for comparing the spectral position of said small portion with said desired central wavelength; and
   means for acting on said adjustment means for adjusting said optical length in a direction tending to reduce said difference between the central wavelength of said laser beam and said desired central wavelength.

6. A laser system according to claim 4, wherein said adjustment means comprises a piezo-electric stack supporting said outlet mirror.

7. A laser system according to claim 4, wherein said main laser cavity includes a first optical path on one side of said dye amplifier assembly passing through a separator blade disposed to apply said laser beam to two facing mirrors in a symmetrical disposition on either side of said saturable absorbent assembly.

8. A laser system according to claim 7, wherein said detection means makes use of beam leakage through one of said two facing mirrors, and acts on said adjustment means to modify the position of the outlet mirror.

9. A laser system according to claim 4, wherein said main laser cavity includes a prism assembly suitable for adjusting the group dispersion of said laser beam within the cavity.

10. A laser system according to claim 4, wherein said dye amplifier assembly includes an amplifier jet positioned substantially in the center of said main laser cavity which is twice as long as the auxiliary laser cavity, with the auxiliary laser operating at twice the repetition rate, to increase the power per main laser pulse.

11. A laser system according to claim 4, wherein the amplifier and absorbent dyes comprise at least one of the substances: Rhodamine 6 G and DODCI.

12. A laser system according to claim 4, wherein the auxiliary laser produces pulses in continuous manner.

13. A laser system according to claim 4, wherein the auxiliary laser produces pulse trains.

14. A laser system according to claim 4, wherein the auxiliary laser is a mode-locked YAG laser with frequency doubling.

15. A laser system according to claim 4, wherein the auxiliary laser is a mode-locked argon or krypton laser.

16. A laser system according to claim 4, wherein the repetition rate of the auxiliary laser is about 100 megahertz, while the spectrum width of the laser pulses produced is about 10 nanometers.

17. A laser system according to claim 4, wherein the detection means includes pre-adjustment means suitable for bringing the spectrum of the pulses produced close to the desired central wavelength.

* * * * *